US00RE48479E

(19) United States
(12) Reissued Patent
Cannon et al.

(10) Patent Number: US RE48,479 E
(45) Date of Reissued Patent: Mar. 23, 2021

(54) MULTIPLE VIEWING ANGLE MEDIA SUPPORT

(71) Applicant: Happy Products, Inc., Portland, OR (US)

(72) Inventors: Bruce Cannon, Portland, OR (US); Juliette Fassett, Portland, OR (US)

(73) Assignee: Happy Products, Inc., Portland, OR (US)

(21) Appl. No.: 16/262,797

(22) Filed: Jan. 30, 2019

Related U.S. Patent Documents

Reissue of:
(64) Patent No.: 9,642,454
Issued: May 9, 2017
Appl. No.: 15/192,737
Filed: Jun. 24, 2016

U.S. Applications:
(63) Continuation-in-part of application No. 14/518,443, filed on Oct. 20, 2014, now abandoned.

(60) Provisional application No. 61/896,540, filed on Oct. 28, 2013.

(51) Int. Cl.
*A47B 97/04* (2006.01)
*A47B 23/04* (2006.01)

(52) U.S. Cl.
CPC ..... *A47B 23/042* (2013.01)

(58) Field of Classification Search
CPC ..... A47B 23/042
USPC ..... 248/441.1, 454; D6/419, 406; D9/91
See application file for complete search history.

(56) References Cited

U.S. PATENT DOCUMENTS

| | | | | |
|---|---|---|---|---|
| 805,895 | A | 11/1905 | Wedderburn | |
| 1,928,806 | A * | 10/1933 | Barcalo | A47G 9/1045 5/639 |
| 3,364,603 | A | 1/1968 | Tate, Jr. | |
| 3,746,296 | A * | 7/1973 | Dean | A47B 65/00 248/441.1 |
| 4,274,616 | A | 6/1981 | Radtke | |
| 4,462,096 | A | 7/1984 | Kusaka | |
| 4,541,190 | A | 9/1985 | Weiner et al. | |
| 4,593,876 | A | 6/1986 | Greiner | |
| 4,880,327 | A | 11/1989 | Sanabria | |
| 4,991,812 | A | 2/1991 | MacEwan | |
| 5,029,797 | A | 7/1991 | Levorchick et al. | |
| D320,319 | S | 10/1991 | Brothers et al. | |
| 5,365,687 | A | 11/1994 | Sclater | |
| 5,413,305 | A | 5/1995 | Leeb | |
| D365,461 | S | 12/1995 | Falter | |
| 5,582,382 | A | 12/1996 | Pan-Yang | |
| D392,474 | S | 3/1998 | Frasketi | |
| 6,196,512 | B1 | 3/2001 | Ure | |

(Continued)

*Primary Examiner* — Cary E Wehner
(74) *Attorney, Agent, or Firm* — Schaffer IP Law, LLC

(57) ABSTRACT

For multiple viewing angle media support, and apparatus includes three support sides. Each support side includes a back support and an edge support. A top of each back support is in physical communication with an adjacent edge support clockwise about a central axis and each back support and each edge support is in physical communication with two ends of a solid interior. Each back support, each edge support, and each end is a surface of the solid interior, the solid interior is a pillow covered in fabric, a first viewing angle of the first back support is 36 degrees, a second viewing angle of the second back support is 74 degrees, and a third viewing angle of the third back support is 49 degrees.

29 Claims, 4 Drawing Sheets

(56) References Cited

U.S. PATENT DOCUMENTS

| | | | | |
|---|---|---|---|---|
| 6,270,049 | B1 | | 8/2001 | Olvey |
| 6,651,367 | B1 | | 11/2003 | Barragan |
| 6,934,084 | B2 | | 8/2005 | Pandya |
| 7,492,538 | B2 | | 2/2009 | Ishizawa et al. |
| 7,626,776 | B2 | | 12/2009 | Honma et al. |
| 7,627,238 | B2 | | 12/2009 | Osaka et al. |
| 7,639,440 | B2 | | 12/2009 | Ishizawa et al. |
| 7,641,403 | B2 | | 1/2010 | Ishizawa et al. |
| 7,652,833 | B2 | | 1/2010 | Honma |
| 7,705,909 | B2 | | 4/2010 | Ishizawa et al. |
| 7,852,579 | B2 | | 12/2010 | Osaka et al. |
| D640,112 | S | | 6/2011 | Smith |
| 8,038,116 | B2 | | 10/2011 | Lee et al. |
| D677,669 | S | | 3/2013 | Liu |
| D690,308 | S | | 9/2013 | McCoy |
| D696,258 | S | * | 12/2013 | Padilla ..... D14/447 |
| D703,216 | S | | 4/2014 | Klepar |
| 2003/0001063 | A1 | | 1/2003 | Halpin |
| 2003/0136036 | A1 | | 7/2003 | Zubli |

* cited by examiner

MULTIPLE VIEWING ANGLE MEDIA SUPPORT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This is a continuation-in-part of and claims priority to U.S. patent application Ser. No. 14/518,443 entitled "MULTIPLE VIEWING ANGLE MEDIA SUPPORT" and filed on Oct. 20, 2014 for Bruce Cannon, which is incorporated herein by reference. U.S. patent application Ser. No. 14/518,443 claims priority to U.S. Provisional Patent Application No. 61/896,540 entitled "FLIPY EREADER PILLOW" and filed on Oct. 28, 2013 for Bruce Cannon, which is incorporated herein by reference.

FIELD

The subject matter disclosed herein relates to media support and more particularly relates to multiple viewing angle media support.

BACKGROUND

Description of the Related Art

It is often comfortable to support media such as electronic readers, tablet computers, magazines, and books while viewing the media.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The description of elements in each figure may refer to elements of proceeding figures. Like numbers refer to like elements in all figures, including alternate embodiments of like elements.

Figure 1:
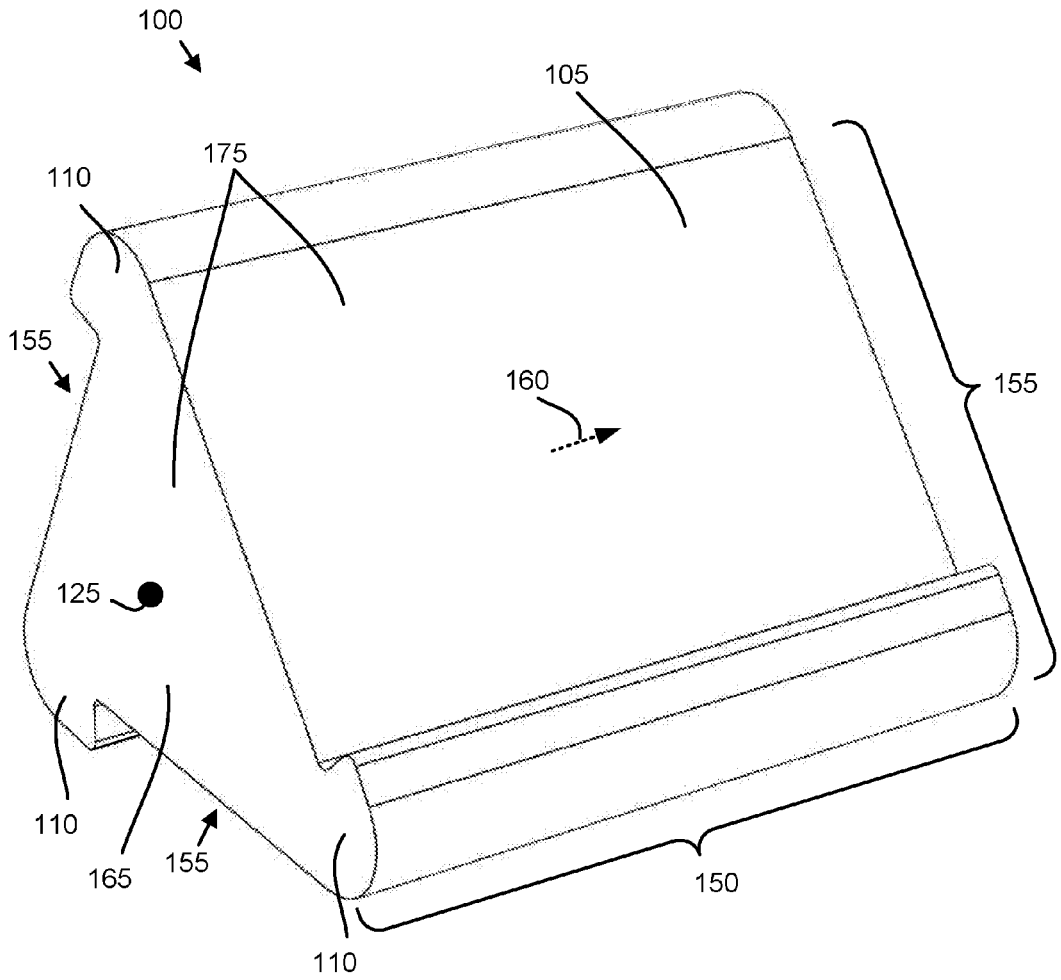
FIG. 1 is a perspective drawing illustrating one embodiment of a media support.

FIG. 1 is a perspective drawing illustrating one embodiment of a media support 100. The media support 100 may position media at one of three varied and carefully chosen angles for viewing by a user. The media may be handheld media. In addition, the media may be an electronic reader, a tablet computer, a video display, a magazine, a book, or the like. Because the media may be handheld, it is often viewed while the user is sitting at a table with the media on the table, while the user is sitting with the media disposed in the user's lap, or while the user is lying down.

During extended periods of viewing, it may be comfortable for the user to prop up the media to reduce hand and arm fatigue. Unfortunately, the use of traditional pillows may position the media at a less than advantageous angle. In addition, during extended viewing periods, the user may shift position, resulting in a need for a support with a different viewing angle. For example, a user may shift from reading while sitting on a couch to reading while lying on the couch.

The embodiments described herein provide support for multiple viewing angles. The angles are carefully chosen to support the media on a table for a sitting user, in the lap of a sitting user, and on a lying user. As a result, the media support 100 provides a comfortable support at an appropriate angle for the most common viewing positions.

In the depicted embodiment, the media support 100 includes three support sides 155. Each support side 155 comprises a support back 105 and a support edge 110. The support sides 155 may be disposed about a central axis 125. The media support 100 may have a latitudinal length 150. The latitudinal length 150 may be in the range of 6 to 50 centimeters (cm). In a certain embodiment, the latitudinal length 150 is in the range of 9 to 25 cm. In one embodiment, the latitudinal length 150 is 15 cm.

In one embodiment, the latitudinal length 150 of an edge support 110 may be different from the latitudinal length 150 of the corresponding side support 155. The edge support latitudinal length 150 may be in the range of 2 to 10 cm. In a certain embodiment, the edge support latitudinal length 150 is in the range of 6 to 8 cm. In one embodiment, the edge support latitudinal length 150 is 7 cm.

The side supports 155 may be arranged to provide three different viewing angles 160 for three different user positions. Each viewing angle 160 is orthogonal to a support back 105. The arrangement of the side supports 155 are disclosed in greater detail in FIG. 2.

In one embodiment, each back support 105 and each edge support 110 is a surface 175 of a solid. The solid media support 100 may have one or more ends 165. Each back support 105 and each edge support 110 may be in physical communication with two ends 165 of a solid interior.

The solid media support 100 may be a pillow. The solid interior may be foam. The foam may have an Indentation Force Deflection (IFD) of in the range of 15-30 kilograms at 25% indentation. In one embodiment, the surface 175 of the solid may be a fabric. Each back support 105, each edge support 110, and each end 165 may a surface 175 of the solid interior. The surface 175 of the solid interior may be a pillow is covered in fabric. In one embodiment, the fabric is ultra-suede.

A user may place the media support 100 on a table, in the user's lap, or on the user while lying down. The semi-rigid pillow feel of the media support 100 comfortably contacts the user while providing firm support for the media. The user may further rotate the media support 100 to select a back support 105 with a comfortable viewing angle 160. The user may place media on the edge support 110. The edge support 110 holds the media with the back of the media against the back support 105. As a result, the media may be viewed at the viewing angle 160.

Figure 2:
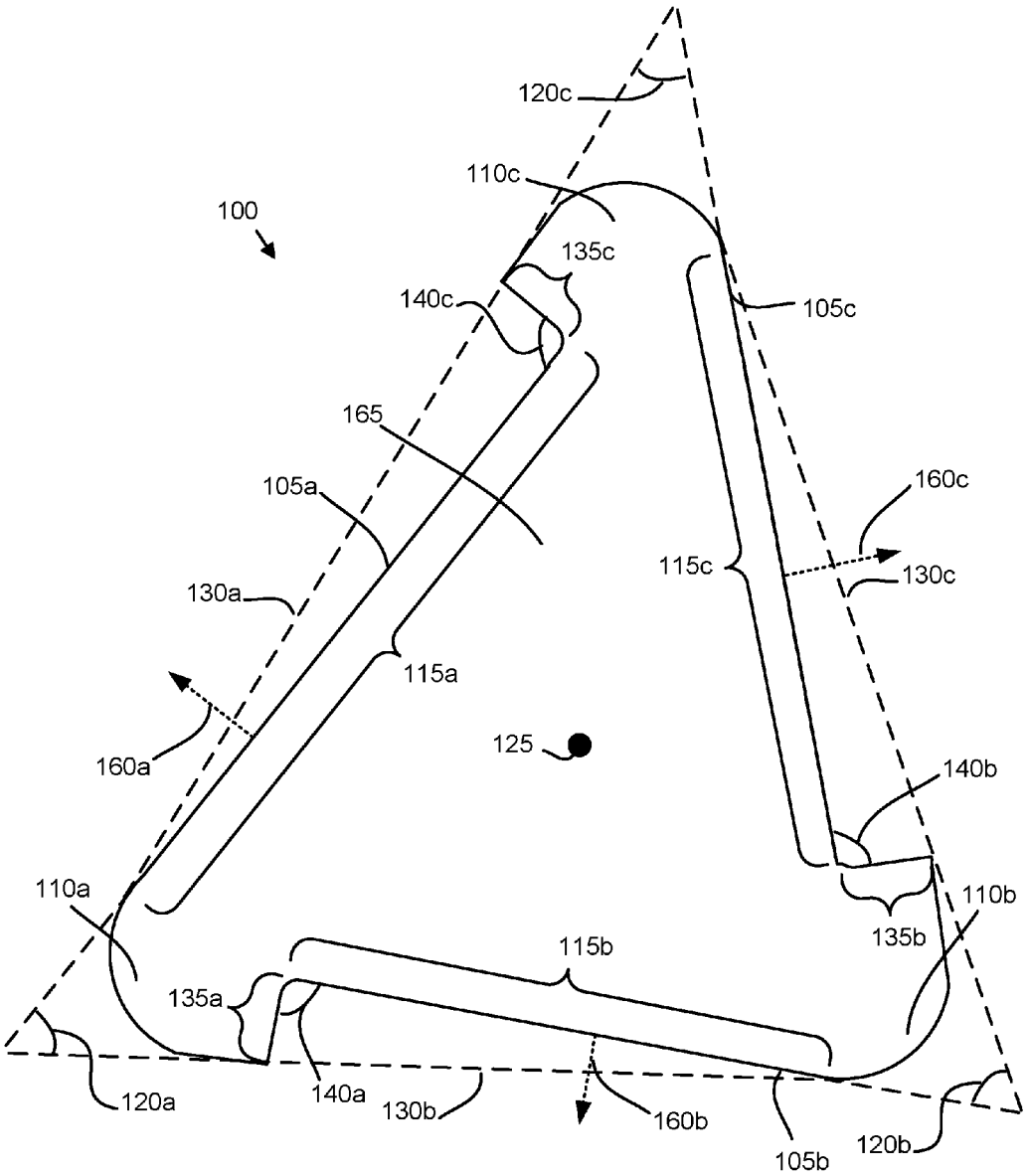
FIG. 2 is a side view drawing illustrating one embodiment of a media support.

FIG. 2 is a side view drawing illustrating one embodiment of a media support 100. The support backs 105 and the support edges 110 of the three support sides 155 are shown about an end 165. A top of each back support 105 is in physical communication with an adjacent edge support 110 about the central axis 125. A plane of a first back support 105a may be at a first plane angle 120a in a range of 50 to 60 degrees to a second virtual plane 130b between the top of a second back support 105b counterclockwise to the first back support 105a and an outer edge of a second edge support 110b counterclockwise to the first back support 105a. In addition, a plane of the second back support 105b may be at a second plane angle 120b in a range of 55 to 65 degrees to a third virtual plane 130c between the top of a third back support 105c counterclockwise to the second back support 105b and an outer edge of a third edge support 110c counterclockwise to the second back support 110b. A plane of a third back support 105c may be at a third plane angle 120c in a range of 50 to 75 degrees to a first virtual plane 130a between the top of the first back support 105a counterclockwise to the third back support 105c and an outer edge of the first edge support 110a counterclockwise to the third back support 105c.

In one embodiment, the first back support 105a has a longitudinal length 115a in the range of 12 to 26 cm, the second back support 105b has a longitudinal length 115b in the range of 9 to 21 cm, and the third back support 105c has a longitudinal length 115c in the range of 10 to 22 cm. In a certain embodiment, the first longitudinal length 115a is 19 cm, the first plane angle 120a is 60 degrees, the second longitudinal length 115b is 15 cm, the second plane angle 120b is 68 degrees, the third longitudinal length 115c is 17 cm, and the third plane angle 120c is 52 degrees.

The arrangement of the longitudinal lengths 115 and the plane angles 120 generate three distinct viewing angles 160. In one embodiment, the first viewing angle 120a may be 36 degrees, the second viewing angle 120b may be 74 degrees, and the third viewing angle 120C may be 49 degrees.

In one embodiment, each edge support 110 forms an edge angle 140 with an adjacent back support 105. The edge angle 140 may be in the range of 85 to 120 degrees. The edge angle 140 may be 90 degrees. Each edge support 110 may have an edge support width 135. The edge support width 135 may be in the range of 1 to 5 cm. In a certain embodiment, the edge support width 135 is 2 cm.

Figure 3:
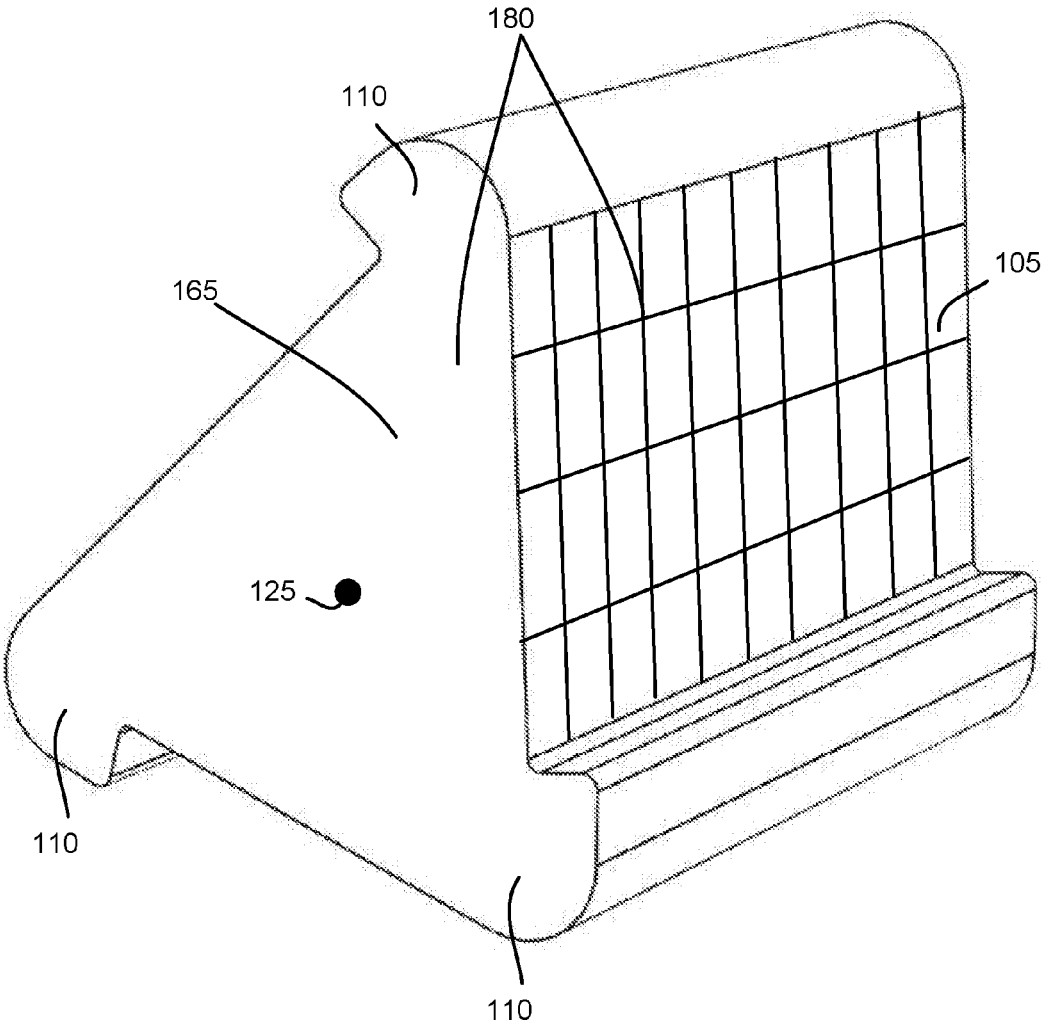
FIG. 3 is a perspective drawing illustrating one alternate embodiment of a media support.

FIG. 3 is a perspective drawing illustrating one alternate embodiment of a media support 100. In the depicted embodiment, each back support 105 and each edge support 110 is a surface 180 of a frame. Each end 165 may also be a surface 180 of a frame. The frame may include a molded mashed, a fabric mash, a wire mesh, or the like. In the depicted embodiment, the media support 100 includes ends 165. Alternatively, there may be no ends 165 on the media support 100.

Figure 4:
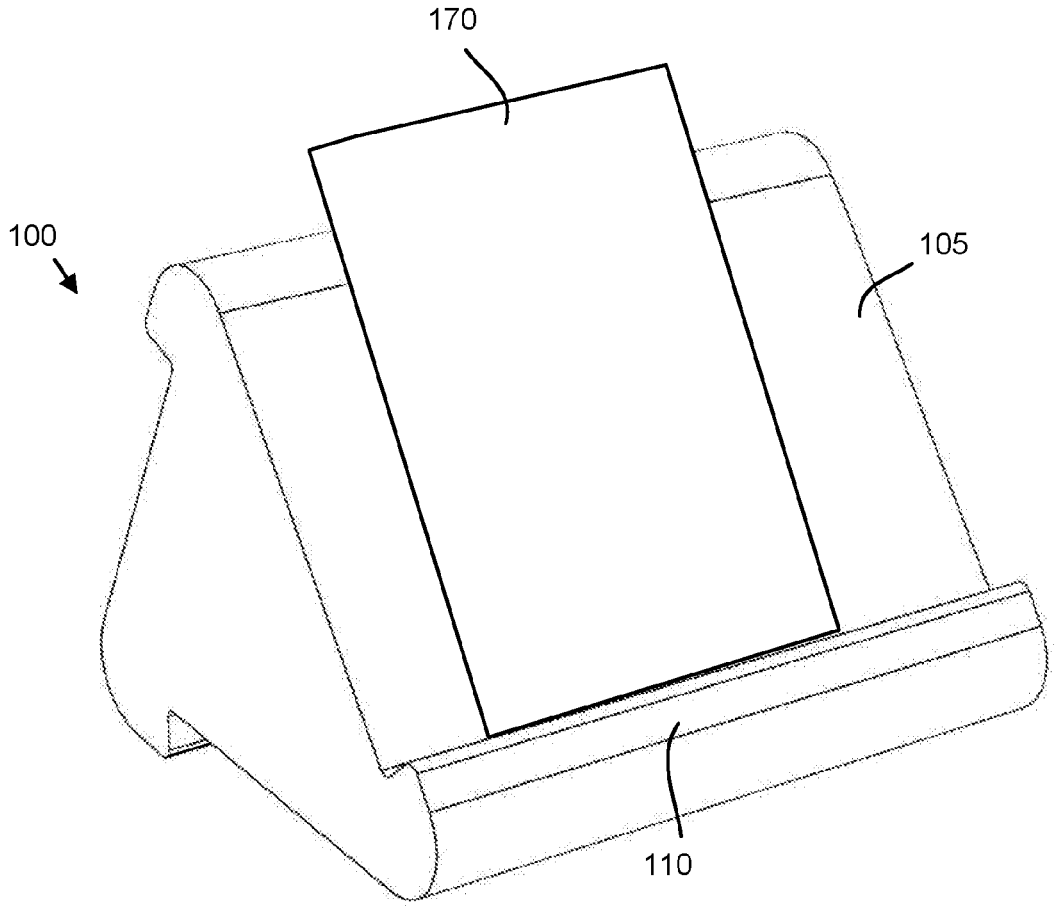
FIG. 4 is a perspective drawing illustrating one embodiment of media disposed on a media support.

FIG. 4 is a perspective drawing illustrating one embodiment of media 170 disposed on the media support 100. A bottom edge of the media 170 is disposed in the edge support 110 while the back of the media 170 is disposed against a back support 105.

The embodiments arrange three support sides 155 to generate three distinct viewing angles 160. Each viewing angle 160 is chosen for a specific viewing orientation. The first viewing angle 160a may be employed when the media support 100 and the media is disposed in the user's lap. The second viewing angle 160b may be used when the media support 100 and the media is disposed on a table and the user is sitting upright. In addition, the 3rd viewing angle 160c may be used when the user is lying down and the media support 100 is disposed on the user.

When the user changes position, the media support 100 may be quickly rotated to provide a different viewing angle 160. As a result, the media support 100 is quickly deployed to provide the appropriate viewing angle 160. In addition, the comfort of the user is greatly enhanced as the media may be viewed at the appropriate viewing angle 160 without the user holding the media.

The media support 100 has been marketed as the "Flipy Tablet Pillow" since 2013 at a retail price of $49.98. Because of the media support's unique properties, it has enjoyed significant commercial success, with 800 units sold in 2013, 2,233 units in 2014, 925 units in 2015 and 997 units year-to-date in 2016.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:

three support sides, each support side comprising a back support and an edge support, wherein a top of each back support is in physical communication with an adjacent edge support clockwise about a central axis and each back support and each edge support is in physical communication with two ends of a solid interior, each edge support comprises an edge support width of 2 centimeters (cm) with an edge angle of 90 degrees to an adjacent back support, a face of each edge support width oriented clockwise about the central axis, a plane of a first back support is at a first plane angle of 60 degrees to a second virtual plane between the top of a second back support counterclockwise to the first back support and an outer edge of a second edge support counterclockwise to the first back support, a plane of the second back support is at a second plane angle of 80 degrees to a third virtual plane between the top of a third back support counterclockwise to the second back support and an outer edge of a third edge support counterclockwise to the second back support, a plane of a third back support is at a third plane angle of 40 degrees to a first virtual plane between the top of the first back support counterclockwise to the third back support and an outer edge of the first edge support counterclockwise to the third back support, and wherein each back support, each edge support, and each end is a surface of the solid interior, the solid interior is a pillow covered in fabric, a first viewing angle of the first back support is 36 degrees, a second viewing angle of the second back support is 74 degrees, and a third viewing angle of the third back support is 49 degrees.

2. The apparatus of claim 1, wherein the first back support has a longitudinal length in the range of 12 to 26 centimeters (cm), the second back support has a longitudinal length in the range of 9 to 21 cm, and the third back support has a longitudinal length in the range of 10 to 22 cm.

3. The apparatus of claim 2, wherein the first longitudinal length is 19 cm, the first plane angle is 60 degrees, the second longitudinal length is 15 cm, the second plane angle is 68 degrees, the third longitudinal length is 17 cm, and the third plane angle is 52 degrees.

4. The apparatus of claim 1, wherein each back support has a latitudinal length in the range of 9 to 25 cm.

5. The apparatus of claim 4, wherein each back support has a latitudinal length of 15 cm.

6. The apparatus of claim 1, wherein each edge support has a latitudinal length in the range of 2 to 10 cm.

7. The apparatus of claim 6, wherein each edge support has a latitudinal length of 7 cm.

8. The apparatus of claim 1, wherein each edge support has an edge support width in the range of 1 to 5 centimeters (cm).

9. The apparatus of claim 1, wherein a plane of each edge support forms an edge angle in the range of 85 to 120 degrees with an adjacent back support.

10. The apparatus of claim 9, wherein the edge angle is 90 degrees.

*11. The apparatus of claim 1, wherein a latitudinal length of each of the first, second, and third edge supports is different from a latitudinal length of the corresponding first, second, and third side supports.*

*12. A media support apparatus comprising:*

*a body having a first support back, a second support back, and a third support back disposed about a central axis;*

*a first support edge disposed between the first support back and the second support back, the first support back and first support edge are configured to support a media device at a first support angle;*

*a second support edge disposed between the second support back and third support back, the second support back and second support edge are configured to support a media device at a second support angle;*

*a third support edge disposed between the third support back and first support back, the third support back and third support edge are configured to support a media device at a third support angle, wherein each edge support comprises an edge support width with an edge angle in the range of 85 to 120 degrees to an adjacent support back, a face of each edge support width oriented clockwise about the central axis;*

*wherein the media support apparatus is configured to be rotated about the central axis so that the body can rest on a horizontal support in any one of three positions including on a first virtual plane between a top of the second support back and an outer edge of the second edge support, on a second virtual plane between a top of the third support back and an outer edge of the third edge support, and on a third virtual plane between a top of the first support back and an outer edge of the first edge support; and*

*wherein the media support apparatus is configured to provide a first viewing angle of the media device when the media support apparatus body rests on the first virtual plane and the media device is supported at the first support angle, a second viewing angle when the media support apparatus body rests on the second virtual plane and the media device is supported at the second support angle, and a third viewing angle when the media support apparatus body rests on the third virtual plane and the media device is supported at the third support angle, wherein the first viewing angle, the second viewing angle, and the third viewing angle are different from one another.*

*13. The apparatus of claim 12, wherein the first support angle is between 50 and 60 degrees to the second virtual plane, the second support angle is between 55 and 65 degrees to the third virtual plane, and the third support angle is between 50 and 75 degrees to the first virtual plane.*

*14. The apparatus of claim 12, wherein the first support angle is 60 degrees to the second virtual plane, the second support angle is 68 degrees to the third virtual plane, and the third support angle is 52 degrees to the first virtual plane.*

*15. The apparatus of claim of 12, wherein the edge support angle is 90 degrees.*

*16. The apparatus of claim 15 wherein the edge support width is 2 cm.*

*17. The apparatus of claim 12, wherein the body includes three solid corners, with each of the corners interposed between two adjacent support backs and including a respective edge support.*

*18. The apparatus of claim 12, wherein the body is foam having an indentation force deflection (IFD) in the range of 15-30 kilograms at 25% indentation.*

*19. The apparatus of claim 12, wherein the edge support width is in the range of 1 to 5 cm.*

*20. An apparatus comprising:*

*three support sides, each support side comprising a back support and an edge support,*

*wherein a top of each back support is in physical communication with an adjacent edge support clockwise about a central axis and each back support and each edge support is in physical communication with two ends,*

*wherein each edge support comprises an edge support width with an edge angle to an adjacent back support in the range of 85 to 120 degrees to an adjacent back support,*

*wherein a face of each edge support width is oriented clockwise about the central axis,*

*wherein a plane of a first back support is at a first plane angle to a second virtual plane between the top of a second back support counterclockwise to the first back support and an outer edge of a second edge support counterclockwise to the first back support,*

*wherein a plane of the second back support is at a second plane angle to a third virtual plane between the top of a third back support counterclockwise to the second back support and an outer edge of a third edge support counterclockwise to the second back support,*

*wherein a plane of a third back support is at a third plane angle to a first virtual plane between the top of the first*

*back support counterclockwise to the third back support and an outer edge of the first edge support counterclockwise to the third back support,*

*wherein the first plane angle, the second plane angle, and the third plane angle are different from one another and are configured to provide a first viewing angle, a second viewing angle, and a third viewing angle that are different from one another; and*

*wherein each back support, each edge support, and each end is a surface of an interior.*

*21. The apparatus of claim 20, wherein the first back support has a longitudinal length in the range of 12 to 26 centimeters (cm), the second back support has a longitudinal length in the range of 9 to 21 cm, and the third back support has a longitudinal length in the range of 10 to 22 cm.*

*22. The apparatus of claim 21, wherein the first longitudinal length is 19 cm, the first plane angle is 60 degrees, the second longitudinal length is 15 cm, the second plane angle is 68 degrees, the third longitudinal length is 17 cm, and the third plane angle is 52 degrees.*

*23. The apparatus of claim 20, wherein each back support has a latitudinal length in the range of 9 to 25 cm.*

*24. The apparatus of claim 23, wherein each back support has a latitudinal length of 15 cm.*

*25. The apparatus of claim 20, wherein each edge support has a latitudinal length in the range of 2 to 10 cm.*

*26. The apparatus of claim 25, wherein each edge support has a latitudinal length of 7 cm.*

*27. The apparatus of claim 20, wherein each edge support has an edge support width in the range of 1 to 5 centimeters (cm).*

*28. The apparatus of claim 20, wherein a plane of each edge support forms an edge angle of 90 degrees with an adjacent back support.*

*29. The apparatus of claim 28, wherein each edge support has an edge support width of 2 centimeters (cm).*

* * * * *